(12) United States Patent
Packer

(10) Patent No.: US 9,210,979 B2
(45) Date of Patent: Dec. 15, 2015

(54) CONVENIENT KEY SOLUTION

(71) Applicant: NANOKEYS, INC., Logan, UT (US)

(72) Inventor: Bryce Sterling Packer, Logan, UT (US)

(73) Assignee: NANOKEYS, INC., Logan, UT (US)

( * ) Notice: Subject to any disclaimer, the term of this patent is extended or adjusted under 35 U.S.C. 154(b) by 0 days.

(21) Appl. No.: 14/643,672

(22) Filed: Mar. 10, 2015

(65) Prior Publication Data

US 2015/0257503 A1    Sep. 17, 2015

Related U.S. Application Data

(60) Provisional application No. 61/951,413, filed on Mar. 11, 2014.

(51) Int. Cl.
*G05D 3/00* (2006.01)
*E05B 29/00* (2006.01)
*A45C 13/02* (2006.01)
*B60R 25/24* (2013.01)

(52) U.S. Cl.
CPC ............... *A45C 13/023* (2013.01); *B60R 25/24* (2013.01)

(58) Field of Classification Search
CPC ... A45C 13/023; B60R 25/24; H04N 5/23203
USPC ............ 701/2; 70/21, 31, 116, 120, 478, 475, 70/156, 278.2, 283.1, 284, 368, 369, 70/383–393, 447–460
See application file for complete search history.

(56) References Cited

U.S. PATENT DOCUMENTS

| | | | |
|---|---|---|---|
| 3,886,528 A * | 5/1975 | Irani ...................... | G05B 19/05 365/230.06 |
| 6,956,460 B2 | 10/2005 | Tsui | |
| 7,051,561 B2 * | 5/2006 | Moon ................. | E05B 47/0673 340/5.6 |
| 7,218,202 B2 * | 5/2007 | Bacchiaz ............. | B60R 25/252 340/5.52 |
| D618,983 S | 7/2010 | Downes | |
| D624,305 S | 9/2010 | Downes | |
| 8,146,736 B2 | 4/2012 | Downes | |
| 8,225,696 B2 | 7/2012 | Downes | |
| 8,485,007 B2 | 7/2013 | Downes | |
| 9,002,536 B2 * | 4/2015 | Hatton .................... | B60R 25/24 340/426.13 |
| 2002/0059523 A1 * | 5/2002 | Bacchiaz .............. | B60R 25/252 726/2 |
| 2009/0096469 A1 * | 4/2009 | Milburn ................ | B60R 25/045 324/691 |
| 2011/0285528 A1 * | 11/2011 | Weinstein ............... | E05B 19/22 340/539.11 |
| 2014/0277837 A1 * | 9/2014 | Hatton .................... | B60R 25/24 701/2 |

OTHER PUBLICATIONS

Universal Car Remote; Accessed Mar. 10, 2015; https://www.universalcarremote.com.
iKeyless Replacement Car Keys and Keyless Entry Remotes; Accessed Mar. 10, 2015; https://ikeyless.com.
Keyport; Accessed Mar. 10, 2015; http://mykeyport.com/.

* cited by examiner

*Primary Examiner* — Muhammad Shafi

(74) *Attorney, Agent, or Firm* — Workman Nydegger

(57) ABSTRACT

A key holder for holding a variety of different physical keys and wireless key devices can comprise a container for holding insert components that are selectively removable and addable to the container. The insert components can comprise one or more key blades that are attached to the container such that a portion of each of the one or more key blades angularly rotates out of the container when in use. Additionally, one or more buttons can be integrated into the container. The buttons are configured to lock one or more of the insert components into place. The holder can also comprise a wireless module that is in communication with a processing unit disposed within the key container.

19 Claims, 7 Drawing Sheets

CONVENIENT KEY SOLUTION

CROSS-REFERENCE TO RELATED APPLICATIONS

This application claims priority to and the benefit of U.S. Provisional Application No. 61/951,413, filed on Mar. 11, 2014, entitled "CONVENIENT KEY SOLUTION," which is incorporated by reference herein in its entirety.

BACKGROUND OF THE INVENTION

1. Technical Field

The present invention relates generally to keys and wireless key devices.

2. Background and Relevant Art

Throughout normal daily life many individuals are required to use many different keys—keys for their automobiles, keys for their houses, keys for their mail, keys for their work, etc. Recently, with increasing popularity, automakers in particular, have begun to move away from physical keys in the traditional sense. Many of these companies are instead creating wireless keys. Some of which require a button press to unlock the doors of a car, and others which only require that a key dongle be proximate to the automobile for the doors to automatically unlock and the automobile to automatically start at the push of a button.

While wireless keys may have increased the ease with which a car can be accessed, they have also increased the difficulty associated with carrying keys. Many wireless keys are the size of conventional car remotes. As the number of wireless keys and car remotes has increased, it has become increasingly difficult for individuals to fit the large bundle of keys and remotes within a pant's pocket.

Many individuals are required to carry a key chain holding many different keys and wireless remotes. These key chains can be both cumbersome and uncomfortable to carry. Large key chains can also become tangled, making the individual keys difficult to access. As such, there is a need in the field for devices that aid in the transport and use of multiple keys.

BRIEF SUMMARY OF THE INVENTION

Implementations of the present invention comprise systems, methods, and apparatus configured to conveniently store and access multiple keys. In particular, implementations of the present invention comprise a key holder that is configured to receive multiple different keys blades, each of which can be independently matched to a particular lock. Additionally, in at least one implementation, the key holder can also comprise at least one built-in wireless device that is configurable to actuate at least one wireless key system.

At least one embodiment of the present invention can comprise a key holder for holding a variety of different physical keys and wireless key devices. The key holder can comprise a container for holding insert components that are selectively removable and addable to the container. The insert components can comprise one or more key blades that are attached to the container such that a portion of each of the one or more key blades angularly rotates out of the container when in use. Additionally, one or more buttons can be integrated into the container. The buttons are configured to lock one or more of the insert components into place. The holder can also comprise a wireless module that is in communication with a processing unit disposed within the key container.

An additional embodiment can comprise a key holder for holding a variety of different physical keys and wireless key devices. The key holder can comprise two parallel plates physically joined together by an attachment point spanning down at least a portion of the longitudinal midsection of each parallel plate. The key holder can also comprise a spring bar spanning between and attaching to the two parallel plates. The spring bar may be compressibly removable from the key holder. The key holder may also include one or more insert components comprising respective attachment heads that are in communication with the spring bar. The one or more insert components may be removable from the spring bar when the spring bar is removed from the key holder. Additionally, the key holder may comprise a processing module disposed within the key holder and in communication with a wireless module. The wireless module can also comprise an automobile ignition transponder and an automobile keyless entry wireless antenna.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and apparatus configured to conveniently store and access multiple keys. In particular, implementations of the present invention comprise a key holder that is configured to receive multiple different keys blades, each of which can be independently matched to a particular lock. Additionally, in at least one implementation, the key holder can also comprise at least one built-in wireless device that is configurable to actuate at least one wireless key system.

Accordingly, one or more embodiments of a convenient holder for keys can include a configuration that allows a user to easily access individual keys from among a plurality of keys held within the holder. Additionally, in at least one embodiment, the holder can include a system or component that allows a user to easily add and remove keys, components, or tools from the holder. For example, a user may desire to add a house key to the holder, or to remove a car key and replace it with a new car key. Further, in at least one implementation, the holder can include at least one wireless device that can either actively or passively communicate with a locking and/or ignition system.

Figure 1:
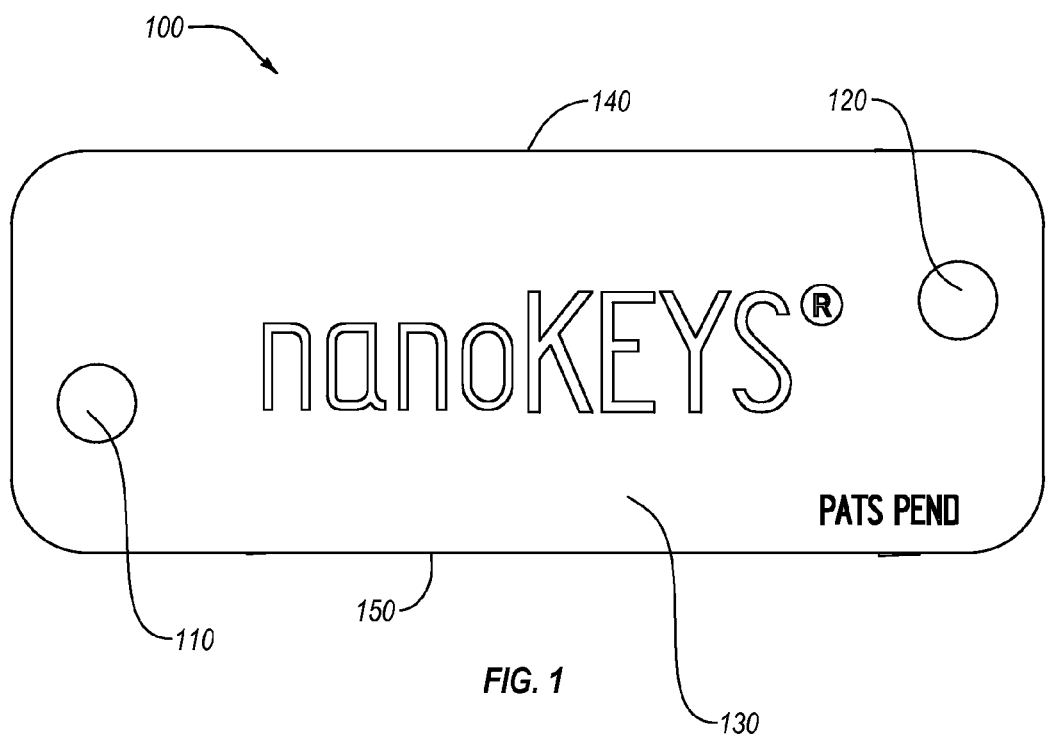
FIG. 1 illustrates a view of a key holder in accordance with embodiments of the present invention.

For example, FIG. 1 illustrates an embodiment of a key holder 100. The depicted key holder 100 comprises a first button 110, a second button 120, and a front shell face 130. In other implementations, the key holder 100 can include a lesser or greater number of buttons 110, 120. The key holder's 100 front shell face 130 can be comprised of any number of different materials, including, but not limited to wood, metal, aluminum, plastic, carbon fiber, precious metals, or any other suitable material.

In at least one embodiment, a user can customize his or her key holder 100 by picking the size of the key holder 100 along with the types and colors of materials that are used in constructing the key holder 100. Additionally, the components can be interchangeable such that a user can later switch between a selection of materials and colors. In at least one embodiment, a user may also be able to create customized designs that can be laser engraved, painted, or otherwise applied to the key holder 100.

When using the key holder 100, in at least one embodiment, a user can press a button 110, 120 to cause a particular key blade to be released from the key holder 100. In the depicted embodiment, when a key blade is released from the key holder 100, the key blade can rotate outward from a pivot point connecting a bottom portion of the key blade to an end point of the key holder 100. In at least one embodiment, the key blade can be spring loaded such that the key self actuates out of the key holder 100. In an alternate embodiment, when a user presses a button 110, 120 it can cause all key blades associated with a particular end of the key holder 100 to become unlocked from a folded position, such that a user can extract a particular key blade from the key holder 100 for use.

In the depicted embodiment, the key holder 100 can comprise openings on two sides 140, 150 of the key holder 100. Each opening 140, 150 may be configured to receive one or more key blades. Additionally, key blades may be attachable to both ends of each of the two sides 140, 150 such that key blades can be folded out from either end. Accordingly, in at least one embodiment, the key holder 100 can comprise key blades attached to any of four different points within the key holder 100 the left end of the top side 140, the right end of the top side 140, the left end of the bottom side 150, and the right end of the bottom side 150. In an alternate embodiment, the key holder 100 comprises key blades attached to a single side 140 or 150 of the key holder 100. The key holder 100 can be configured to receive a variety of different sizes and shapes of keys and other accessories, which will be described more fully below.

In at least one implementation, each attachment point can be associated with a unique button 110, 120, each individual key blade can be associated with a unique button 110, 120, the keys blades can all be associated with a single button 110, 120, or the key blades can be associated with no buttons at all. In various embodiments, a user may be able to select an appropriate number of buttons to include on the key holder 100 to meet the individual user's needs.

In addition to the features depicted in FIG. 1, the key holder 100 can also include various features such as a pocket clip, a hole configured to receive a lanyard or chain, a tab, a swivel mount, and or various other attachment accessories. Accordingly, the key holder 100 can be constructed of a variety of different materials, be customized to include specific colors and design, and be customized to include specified functionality as a key holder 100.

Figure 2:
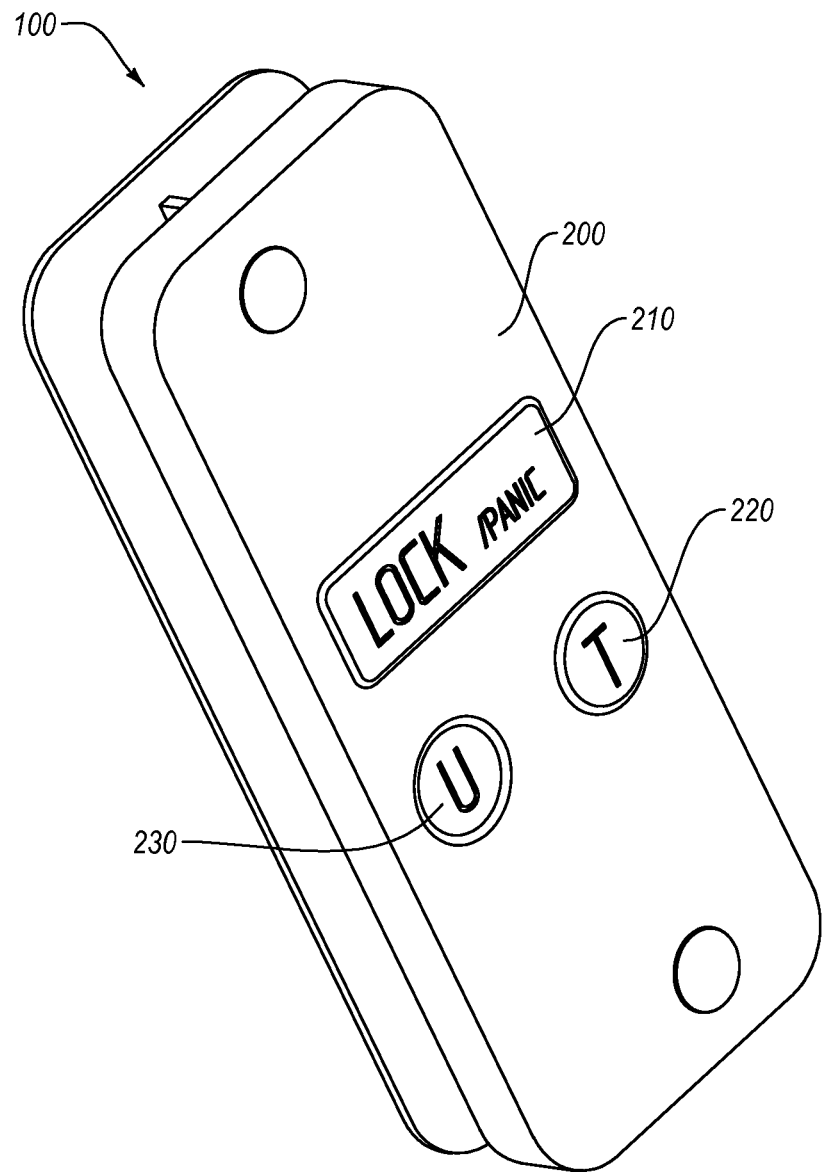
FIG. 2 illustrates another view of a key holder of FIG. 1, including a view of a wireless remote portion in accordance with embodiments of the present invention.

In at least one embodiment, a key holder 100 can also include a wireless remote portion. For example, FIG. 2 illustrates an embodiment of a key holder of FIG. 1 that includes a wireless remote portion 200. While the wireless remote portion is depicted as being a protrusion on a face of the key holder 200, in alternate embodiments, the wireless remote portion 200 can be otherwise incorporated into the key holder 100. For instance, the wireless remote portion 200 can be embedded directly within the center of the key holder 100 such that the key holder is symmetric along its side longitudinal axis. Additionally, the wireless remote portion 200 may also be embedded within a key insert, such that a wireless module can be attached to the key holder 100 like a key.

A variety of different types and configurations of wireless remotes 200 can be incorporated into a key holder 100. For example, a key holder 100 can comprise a wireless remote portion 200 that is configurable to communicate either passively or actively, with automobile systems, home security systems, garage doors, RFID systems, Bluetooth systems, and other similar commonly used systems.

In at least one embodiment, wireless controller buttons 210, 220, 230 can allow a user to cycle through a number of different wireless remote configurations. For example, a user may be able to toggle between a wireless configuration for the user's car and a different wireless configuration for the user's truck. Similarly, the user can toggle between configurations for a home security system, an RFID configuration, a garage door opener, and any number of other wireless systems. In at least one implementation, the key holder 100 comprises a visual indicator, such as an LED or display that indicates the current wireless remote configuration for the wireless remote portion 200.

Additionally, in at least one embodiment, the key holder 100 may also comprise an induction charging module that allows the key holder 100 to be charged with an induction charger. Using induction charging may allow for a key holder 100 that has a great level of water resistance, due to the lack of open ports.

In at least one implementation, the induction channel can also be used to communicate with the key holder 100. For example, a user may be able to program the key holder 100 for a first type of car and then later reprogram the key holder 100 for another type of car. In at least one implementation, the key holder 100 can also be updated to include new vehicles and capabilities through the induction channel. For instance, a user may select various vehicles models and key holder features from a website. Software modules may then be downloaded to a local computing device and then uploaded to the key holder 100 through the induction channel or through some other means.

Further, in at least one embodiment, the key holder 100 can comprise a configurable RFID module integrated within the key holder 100. The RFID module may be programmable such that a user can clone an access card, credit card, or other RFID. In at least one implementation, the RFID module is programmable through an induction channel, which may comprise the induction-charging channel. The RFID module may also be coupled to an external mobile computing device, such as a smart phone. For example, in at least one implementation, the RFID module must verify that the key holder 100 is in Bluetooth communication with the smart phone in order for the RFID module activate. As such, in the case that a key holder 100 was stolen or misplaced, another person would not be able to activate the RFID module unless they also had access to the owner's smart phone. When used, the RFID module may cycle through a plurality of stored RFID signals, allowing a user to use the RFID feature without actively selecting a specific RFID configuration.

The wireless control buttons 210, 220, 230 may communicate to a transponder chip, or other processing unit, within the key holder 100. The transponder chip may be configurable to communicate with and disarm various vehicle immobilizers. For example, the key holder 100 may comprise an internal processing unit that is in communication with one of more communication antennas and one or more storage modules. When the processing unit receives an indication to switch to a particular configuration, the processing unit may access the configuration parameters from the storage modules and then actuate the proper communication antennas based upon the stored information.

For example, a particular key holder 100 may be associated with two different vehicles. Each vehicle may require a specific transponder to be associated with a key in order for the security systems in the vehicles to allow the key to start the vehicle. In at least one implementation, instead of broadcasting both signals, a processing unit within the key holder 100 can cause the key holder 100 to broadcast only the desired transponder signal when a user selects the configuration for the vehicle of interest. Selecting a configuration of interest may comprise a user pushing a button 110, 120, 210, 220, 230 or button sequence on the surface of the key holder 100. Additionally, in at least one embodiment, the user selects the configuration of interest by extending a key that is associated with a particular vehicle. For example, extending a key associated with a particular vehicle may cause the processing unit to automatically activate the transponder signal associated with the extended key. Broadcasting from only a single transponder chip may lower the likelihood of interference caused by broadcasting multiple potentially conflicting signals.

Similarly, the processing unit may be configured to activate only a single wireless remote signal when communicating with a particular vehicle. For example, a user may desire to unlock to doors of a particular vehicle. The user can select a particular key holder configuration that will communicate with only the vehicle of interest. In contrast, in at least one implementation, the key holder 100 can be configured to broadcast all of the wireless signals and transponder signals for all of the configured vehicles at the same time or in series.

For instance, a particular communication configuration may be directed towards a radio frequency communication to a particular vehicle. Using the stored information and the communications antenna, the processing unit can communicate various stored commands to the particular vehicle. In at least one implementation, the processing unit may also be in communication with component inserts within the key holder 100. For example, a particular insert may comprise a Bluetooth module. The processing unit may be capable of communicating with the Bluetooth module insert and leveraging it to communicate with various Bluetooth capable devices.

Additionally, in at least one implementation, the wireless controller buttons 210, 220, 230 can be customized to perform any number of different functions. For example, a user can program the wireless controller buttons 210, 220, 230 to unlock and lock car doors, open a car trunk, start a car, open a garage, active or deactivate a home security system, or any number of other common functions.

The wireless remote portion 200 can also include functionality that allows a user to unlock or start an automobile with a passive wireless remote car system. For example, in a properly configured and equipped automobile, a user can approach a car; at which point the wireless remote portion 200, without interaction from the user, can passively communicate with the car's wireless remote system. Based upon this communication, the car's wireless remote system can automatically unlock the doors and allow the user to start the car without having to insert a key into the car's ignition system.

When configuring a wireless remote portion 200 to operate with the variety of different systems, a user may be able to program the wireless remote portion 200 by cloning the signal of an existing remote, by associating the remote with the system of choice (e.g., using an automobile's built in pairing process), by purchasing a key holder 100 component that is pre-programmed to the desired system, by incorporating a specific receiving module into the desired system, or through any other common method of pairing and/or programming remotes.

In at least one embodiment, a user can incorporate a receiving module into the desired system. For example, a user can attach a specific receiving module to the port of the On-Board Diagnostics ("OBD") system for a car. The receiving module can be configured to receive communications from the wireless remote portion 200 and to communicate specific commands to the automobile through the OBD system in the car. In contrast to being in communication with the OBD system of the car, in at least one implementation, the receiving module can be otherwise integrated into the cars automatic lock system and ignition system.

In at least one implementation, the OBD receiving module can enable the user to send additional commands to the car via the wireless remote. These commands may be functions that the vehicle was not enabled to perform but can now accomplish because of the added hardware and communications abilities of the OBD receiving module. These features include but are not limited to passive entry and start-up of a vehicle, rolling down the windows, starting the car, arming and disarming an alarm, and any other function of the vehicle that can be performed via the OBD. Additionally the OBD can communicate with Bluetooth devices, such as a smart phone, which allow the user to control these various functions of the vehicle and eliminate the need if desired for the user to carry their physical keys.

Additionally, in at least one implementation, a processing unit within the key holder 100 can be configured to communicate with a mobile computing device, such as a smart phone. Additionally, the processing unit can be configured to only operate with vehicles when a communication channel can be established with a particular mobile computing device. For example, if the particular mobile computing device is outside of Bluetooth range, the processing unit may deactivate transponder and wireless chips. This function may serve as a security feature to verify that a designated user is using the key holder 100.

Figure 3:
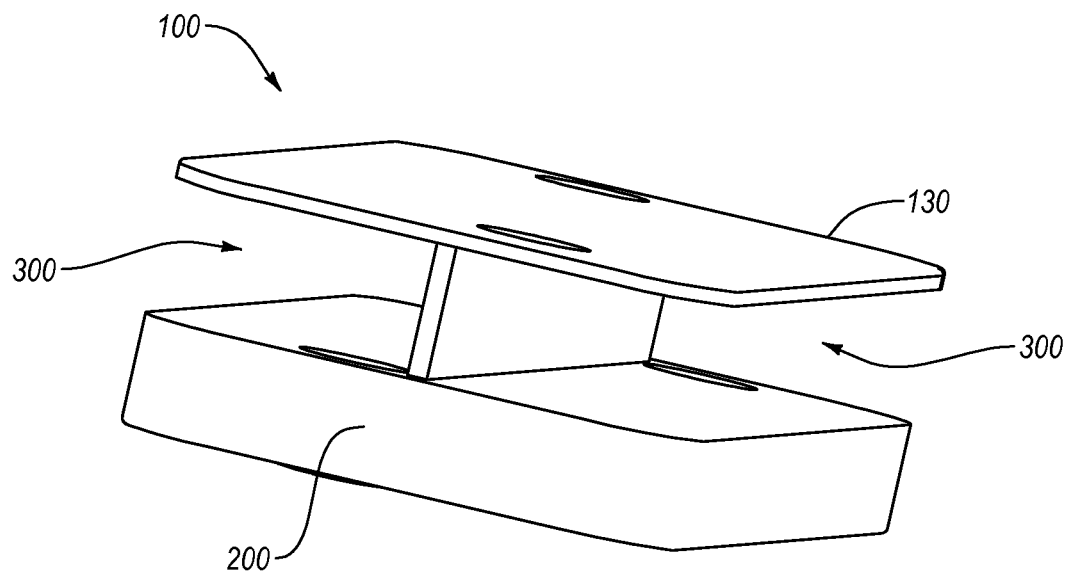
FIG. 3 illustrates another view of the key holder of FIG. 1 in accordance with embodiments of the present invention.

FIG. 3 illustrates another view of the key holder 100 of FIG. 1. Specifically, FIG. 3 depicts a perspective of the key holder 100 that shows the accessory slots 300 within the key holder 100. In at least one embodiment, a user can insert a variety of different accessories within the accessory slots 300, in addition to key blades. For example, in at least one implementation, a user can insert a Bluetooth insert component (see 580 in FIG. 5H) into the slot. The Bluetooth insert component 580 can be paired to a mobile computing device, such as a mobile phone. The mobile phone can then be used to activate an alarm, or other form of location function, on the Bluetooth insert component 580. The user can then rely upon the Bluetooth insert component to locate a lost key holder 100 and keys. In at least one embodiment, the Bluetooth insert component can comprise similar dimensions as a key blade. Additionally, in at least one implementation, a key component can further comprise one or more of Bluetooth, GPS, RFID, or other similar components.

In addition to a Bluetooth insert component 550 and a variety of different keys, the accessory slots 300 can also be used to receive knife blades (see 520 in FIG. 5B), nail files, scissors (see 530 in FIG. 5C), bottle openers (see 550 in FIG. 5E), flashlights (see 570 in FIG. 5G), USB drives (see 560 in FIG. 5F), pliers (see 540 in FIG. 5D), Flash drive modules, RFID chips, other Bluetooth chips 580, and a variety of other similar accessories. Accordingly, in at least one embodiment, if the wireless remote portion 200 is unable to communicate with a particular wireless remote system, an accessory that able to communicate with the wireless remote system can be added to the accessory slots 300.

Figure 4:
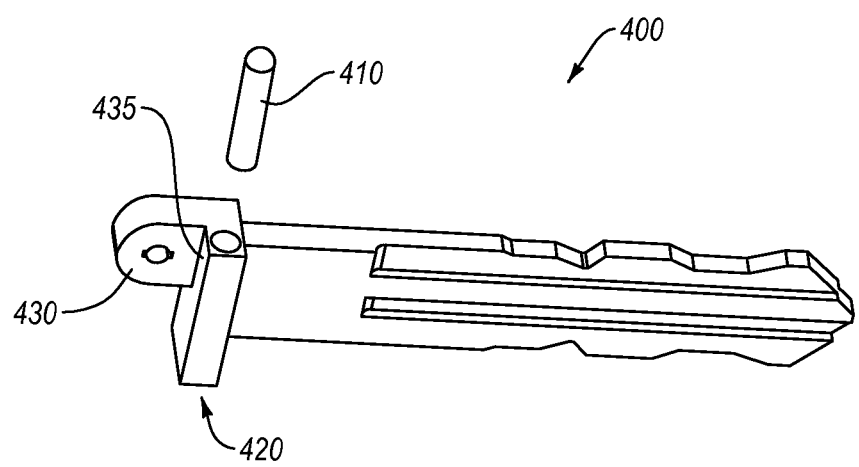
FIG. 4 illustrates a view of a key blade and a transponder chip in accordance with embodiments of the present invention.

FIG. 4 illustrates a view of a key blade 400 and a transponder chip 410. In at least one implementation, the key blade 400 can be attached to an attachment head 420 that is configured to attach within the accessory slots 300 of the key holder 100. The transponder chip 410 can be either programmable or preprogrammed to a particular vehicle or system. Many modern vehicles comprise a security feature that prevents the car from starting unless the key in the ignition includes a particular transponder chip. Accordingly, at least one embodiment of the present invention provides transponder chips 410 that can be incorporated into the key blades 400, allowing the key blades 400 to be used with the various automobile security systems and other systems that similarly require that a computer chip 410 be associated with the key blade 400.

Turning to the attachment head 420, in at least one embodiment, the attachment head 420 an include an attachment point 430 that is at an offset 435 in relation to the body of the attachment head 420. The offset 435 can be configured such that when a key blade 400 is in the open position it is centered with respect to a longitudinal axis of the key holder 100, rather than offset to the side of the key holder 100. Additionally, in at least one embodiment, the attachment head 420 can be configured such that the orientation of the width of the key blade 400 parallel to width of the key holder 100.

The attachment head 420 can comprise a distinct attachment component that is attached to the key blades 400, or, in contrast, the attachment head 420 can be an integral part of the key blades 400. Additionally, in at least one implementation, the transponder chip 410 and the key blade 400 are a single integrated component, such that the transponder chip 410 cannot be removed from the key blade 400.

Figure 5A:
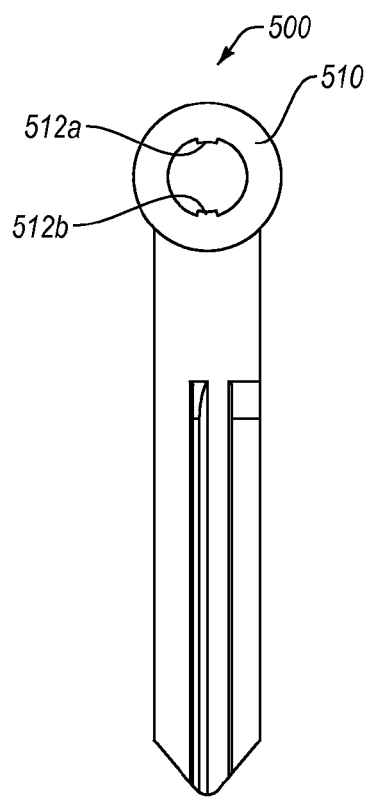
FIG. 5A illustrates a view of a key blade in accordance with embodiments of the present invention.

FIG. 5 illustrates an alternative embodiment of a key blade 500. As depicted, the key blade 500 of FIG. 5 comprises a different attachment head 510 than the attachment head 420 shown in FIG. 4. In particular, the attachment head 510 is not offset, but instead is in alignment with the body of the key blade 500. Additionally, the attachment head 510 comprises two indents 512a, 512b for interacting with the key holder 100. In at least one implementation, the attachment head 510 may comprise an integrated electrical communication pathway that allows a processor within the key holder 100 to communicate with electronics embedded within the key blade 500 or within an insert component (e.g., 520, 530, 540, 550, 560, 570, 580).

Figure 5B:
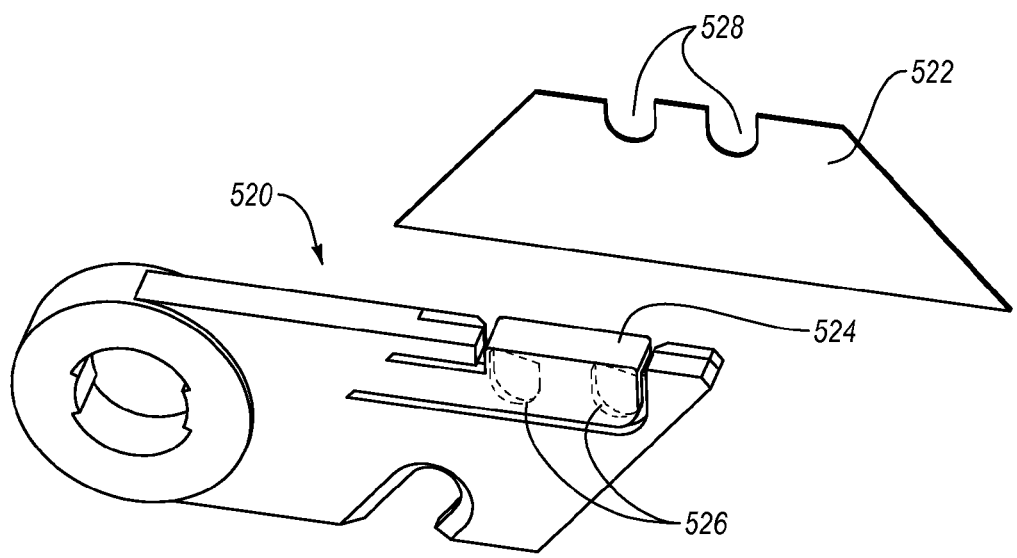
FIG. 5B illustrates a view of a razorblade holder insert component in accordance with embodiments of the present invention.
Figures 5C, 5D, 5E, 5F, 5G, 5H:
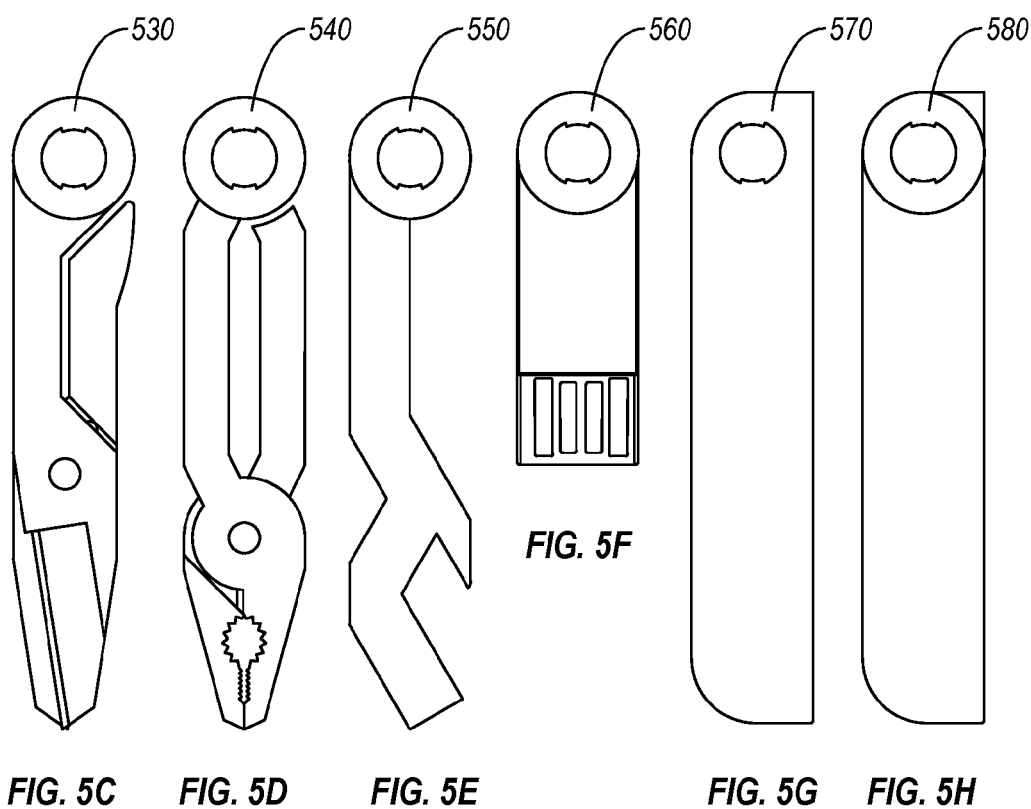
FIG. 5C illustrates a view of a scissor insert component in accordance with embodiments of the present invention.
FIG. 5D illustrates a view of a plier insert component in accordance with embodiments of the present invention.
FIG. 5E illustrates a view of a bottle opener insert component in accordance with embodiments of the present invention.
FIG. 5F illustrates a view of a USB drive insert component in accordance with embodiments of the present invention.
FIG. 5G illustrates a view of an LED light insert component in accordance with embodiments of the present invention.
FIG. 5H illustrates a view of a Bluetooth module insert component in accordance with embodiments of the present invention.

FIG. 5B-5H depicts various embodiments of insert components. Insert components can comprise key blades and various other tools that are adapted to fit within the key holder 100. In particular, FIG. 5B depicts an embodiment of a razorblade holder 520. The razorblade holder 520 can comprise a flexible cut-out 524 that is configured to flexibly move with respect to the body of the razorblade holder 520. Additionally, the cut-out 524 may comprise one or more holding tabs 524 on an interior surface of the cut-out 524. The holding tabs 526 may be configured to mate with indents 528 in the top of a conventional razorblade 522. As such, in at least one implementation, the holding tabs 526 are biased such that a razorblade 522 can be easily inserted into the razorblade holder 520. Once the razorblade 522 is inserted, the holding tabs 526 can engage with the indents 528 such that the razorblade 522 cannot be removed from the razorblade holder 520 unless a user actively lifts the cut-out 524 causing the holding tabs 524 to disengage with the indents 528.

In addition to the razorblade holder 520 of FIG. 5B, FIGS. 5C-5H also show insert components comprising scissors 530, pliers 540, bottle openers 550, USB drives 560, LED flashlights 570, and Bluetooth insert components 580. One will understand that the depicted insert components are merely exemplary, and that any number of additional components can be configured to insert within a key holder 100.

Figure 6A:
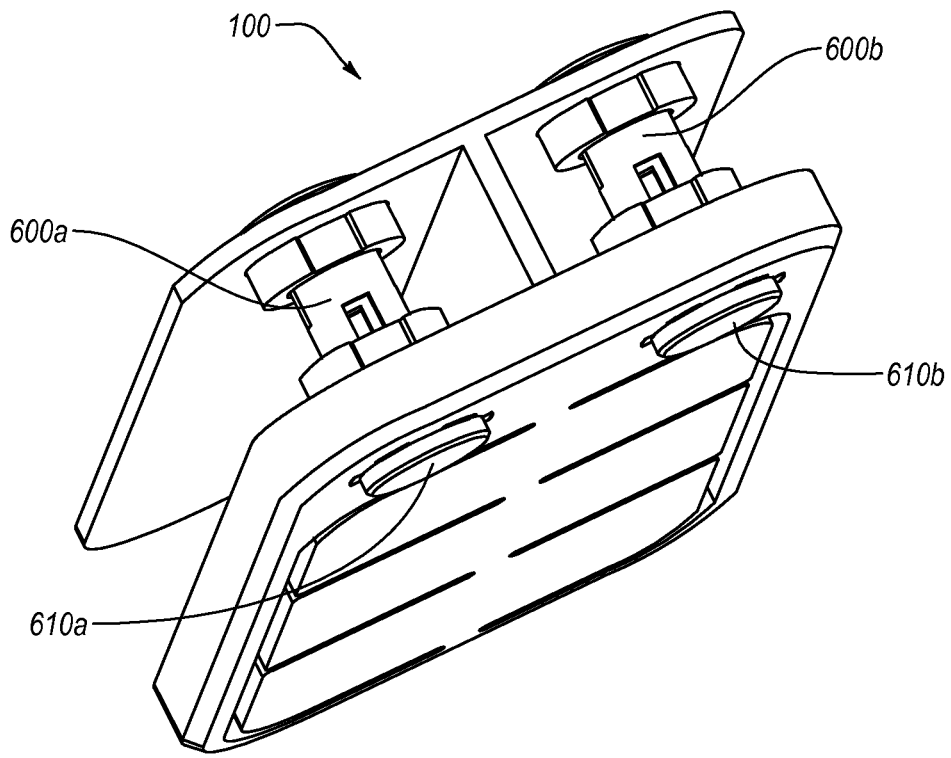
FIG. 6A illustrates a view of another key holder in accordance with embodiments of the present invention.

FIG. 6A depicts an alternate implementation of a key holder 100. In particular, the depicted key holder 100 comprises two buttons 610a, 610b on the same end of the key holder 100, but on opposite corners. As such, the depicted key holder 100 would only have insert components attached to the depicted end of the key holder 100.

Figure 6B:
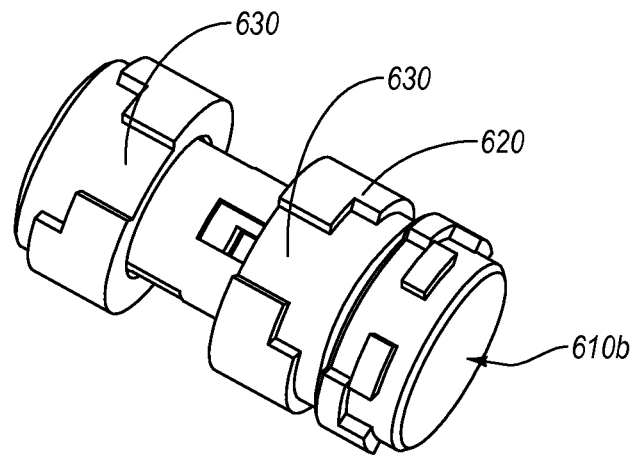
FIG. 6B illustrates a view of a spring bar in accordance with embodiments of the present invention.

FIG. 6A also depicts two spring bars 600a, 600b that are integrated with the buttons 610a, 610b. FIG. 6B depicts a close up view of an isolated spring bar 600. As depicted, a spring bar 600 may comprise buttons, 610a, 610b, on opposite sides. When a user presses the opposite buttons 610a, 610b the opposite sides of the spring bar 600 are compressed towards each other. A spacer 630 may be positioned between the opposite sides to prevent the spring bar 600 from being overly compressed. Both the spacer and at least one of the ends 610a may comprise a notch 630 that is configured to interact with the indents 512a, 512b within the attachment heads 510 of various key blades 500 and insert components.

In at least one implementation, when a user presses the buttons 610a, 610b in to the maximum compression, the entire spring coil 600, including buttons 610a, 610b, can be withdrawn from the key holder 100. As such, a user can withdrawn the entire spring bar 600, replace and/or otherwise change the insert components, recompress the buttons 610a, 610b, and reinsert the spring bar 600 and insert components into the key holder 100. Additionally, the spring bar 600 can be configured to hold a key component in the closed or open position while the spring bar 600 is fully expanded within the key holder 100. As such, a user 100 may have to press a button 610a, 610b and at least partially compress the spring bar 600 before an insert component can be extended or enclosed.

In at least one embodiment, the spring coil 600 also comprises an integrated electrical communication pathway that can communicate with electronics within an insert component (e.g., a Bluetooth insert component). The integrated communication pathway can also communicate with a processing unit with in the key holder—for example, within wireless remote portion 200.

Figure 7:
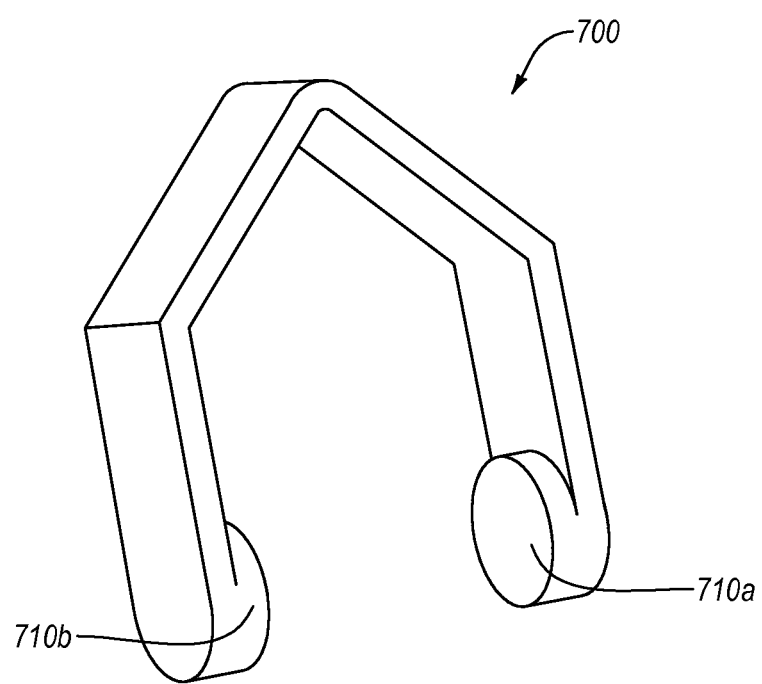
FIG. 7 illustrates a spring bar tool in accordance with embodiments of the present invention.

FIG. 7 depicts a spring bar tool 700. The tool 700 can comprise two button compressors 710a, 710b. The button compressors 710a, 710b can be configured to fit over buttons 610a, 610b. A user can then squeeze the spring bar tool 700 and cause the button compressors 710a, 710b to compress towards each other. This compression may also push the buttons 610a, 610b towards each other and make it easier for a user to withdraw a spring bar 600 from a key holder 100.

Accordingly, one or more embodiments of the present invention provide a key holder 100 that allows a user to manage a plurality of keys and wireless remotes within a single compact solution. Additionally, embodiments of the present invention allow a user to incorporate a variety of different accessories into the key holder 100.

In at least one implementation, a user can create a key holder 100 and appropriate key blades 400 using a kiosk. In particular, at least one implementation of a kiosk for constructing key holders 100 and key blades 400 can comprise an outer body that encases and protects the internal equipment and a viewing window, made of a protective material, through which the customer can see their product being selected and altered to their specifications. The kiosk can further include a touch screen where customers can select and design products as well as perform other tasks. The touch screen can be in communication with a telecommunications jack, antenna, or other means where by it can establish an Internet or phone connection. The kiosk can also provide a point of sales component where a customer can pay using one or more of the following methods: cash, credit card, mobile phone, or other device.

In at least one implementation of a kiosk for constructing key holders 100 and key blades 400, all potential parts and components for creating a key holder 100 and key blade 400 are stored within the kiosk, such that a finished product can be delivered to a user directly from the kiosk. When creating the appropriate key blades 400, in at least one implementation, a kiosk can utilize one or more of the following components: a laser, a scanner, a 3D scanner, a camera, a photograph (sent from a smart phone, tablet or other device capable of taking and/or transmitting photographs), or some other component that is capable or capturing a key shape and key features. In an additional embodiment, the key blank type and cut shape may be identified and recorded using a physical guide that traces the profile of the key on a xy or xyz plane.

Once a key blade 400 shape and/or configuration is determined, the kiosk can form or create the particular key blade. In at least one embodiment, the kiosk can use one or more of the following to create a key blade 400: a traditional key grinder, a key grinder for laser cut and sidewinder key blanks, a laser cutter, a plasma cutter, a 3D printer, or any other device suitable for forming or creating key blades 400.

In addition to creating a physical key blade 400, in order to be functional in many modern automobiles, the key blade 400 must also be in communication with a transponder chip that is specific to the vehicle that matches the physical key blade 400. Accordingly, in at least one implementation, the kiosk can comprise a transponder-icloning module that is configured to read a transponder chip 410 and then to clone the read transponder chip to a new transponder chip 310 that can be embedded into the new key blade 400. As such, in at least one embodiment, the kiosk is able to create a physical key blade 400 and an accompanying matching transponder chip 410.

In at least one embodiment, in addition to creating physical key blades 400, transponder chips 410, and key holders 100, the kiosk can also provide options for customization of a finished key holder 100. For example, a user may be able to utilize a laser, a machining die bit, or other means that allow the kiosk to etch and/or engrave products. These etchings can include text, images or a combination of both and can be selected by the customer as a means of personalizing their product. Additionally, a user may be able to select particular sizes of key holder 100, materials from which to make the key holders 100, and other key holder 100 attributes that can be applied within the kiosk.

At some point during or after the design and/or creation of a key holder 100 and key blades 400, the kiosk can request a user email address, or other contact information, that the kiosk can use to communicate a receipt or other communication to the user. In addition to sending receipts to a user, in at least one implementation, the kiosk can also receive and send information through an Internet connection. For example, the kiosk can receive updated software of database that includes information relating to recent key designs and transponder chip designs. As an additional example, the kiosk can send and receive information regarding inventory, such as quantities sold, quantities needed for restocking, and non-stock and out-of-stock items ordered by a customer that are now available for pickup from the kiosk.

In addition to the kiosk, in at least one embodiment, a software application can also be used to provide additional services relating to key holders 100 and key blades 400. The software application can be configured to execute on smart phones, mobile computing devices, home computers, internet terminals, and/or any other compatible device.

In at least one embodiment, the software application can take a photograph of both sides of the key blank, and then securely store and transmit the photo to a key holder 100 and key blade 400 to a manufacturer for processing. In at least one embodiment, the manufacturer can comprise a kiosk that is either automatically selected for a user or is user selected.

The software application can further comprise a design feature where the user can select the products and features they want and see a visual rendering of their design. The software application can then export these design specifications to the particular websites, manufacturers, and/or kiosks. The software application can further provide a user with the ability to purchase products directly from within the software application.

When taking a picture of the keys, the software application can be configured to automatically turn on the device flash to light the key blank being photographed. Additionally, the software application can also use a gyroscope embedded within device (e.g., smart phones) to verify that the key is photographed at the appropriate angles. Further instructions can be given to the user through the software application to ensure a quality image is captured.

Further, in at least one embodiment, the software application can comprise a function that connects with a locator component disposed within a key holder 100. In particular, the locator component can comprise Bluetooth, GPS, RFID, or a combination thereof, in the form of a key blade 400 insert, or otherwise disposed within the key holder 100. The software application can accordingly be utilized to locate a lost set of keys. For example, the software application can initiate an alarm within the key holder 100, or in some implementations can return to the software application a GPS coordinate of the key holder 100. As an additional example, the software application can also display a visual diagram that shows the user where they are in relation to their keys and a button in the app that, when pressed, will cause the locator insert to make noise, light up, vibrate, or a combination these.

In addition to the above, in at least one embodiment the software application can communicate with a user's vehicle using Bluetooth, RFID, or other means via an OBD receiving module, or other form of receiver. Through this connection the user can use the app to perform functions including but no limited to passive entry and start-up of a vehicle, rolling down the windows, starting the car, arming and disarming an alarm, and any other function of the vehicle that can be performed via the OBD.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

I claim:

1. A key holder for holding a variety of different physical keys and wireless key devices, the key holder comprising:
a container for holding insert components that are selectively removable and addable to the container, wherein the insert components comprise one or more key blades that are attached to the container such that a portion of each of the one or more key blades angularly rotates out of the container when in use;
one or more buttons integrated into the container, wherein the buttons are configured to lock one or more of the insert components into place;
a wireless module in communication with a processing unit disposed within the container, wherein the wireless module is configured to communicate with a plurality of distinct external systems and wherein the wireless module comprises a automobile ignition transponder and an automobile keyless entry wireless antenna; and one or more insert components comprising attachment heads that are in communication with a spring bar, wherein the one or more insert components are removable from the spring bar when the spring bar is removed from the key holder.

2. The key holder recited in claim 1, wherein the orientation of the width of the key blade is parallel to the width of the key holder.

3. The key holder recited in claim 1, wherein at least one of the key blades attaches to the key holder through an offset head portion that is configured to center the key blade relative to a longitudinal axis of the key holder when the key blade is opened.

4. The key holder recited in claim 1, wherein the wireless module is configurable to switch between a plurality of different wireless configurations, each of which is configured to communicate with a particular wireless system.

5. The key holder recited in claim 4, wherein the wireless module comprises:
a transponder module that is configurable to communicate with a vehicle immobilizer; and
a wireless remote that is configurable to communicate with a vehicle keyless entry system.

6. The key holder recited in claim 5, wherein the key holder is configurable to disarm a plurality of different vehicle immobilizers.

7. The key holder recited in claim 5, wherein the key holder is configurable to activate a plurality of different vehicle keyless entry systems.

8. The key holder recited in claim 1, wherein the wireless module is in communication with a receiving module that is disposed within a distinct external system.

9. The key holder recited in claim 8, wherein the receiving module is configured to interface with and send commands through an on-board diagnostics system within an automobile.

10. The key holder recited in claim 1, wherein the key holder comprises a variety of different non-key-blade accessories which are configured to attach to the key holder using the same method of attachment as the key blades.

11. The key holder recited in claim 10, wherein at least one of the variety of different non-key-blade accessories comprises a locator component that further comprises one or more of a Bluetooth component, a GPS component, and an RFID component.

12. The key holder recited in claim 10, wherein at least one of the variety of different non-key-blade accessories comprises an RFID communication module.

13. A key holder for holding a variety of different physical keys and wireless key devices, the key holder comprising:
two parallel plates physically joined together by an attachment point spanning down at least a portion of the longitudinal midsection of each parallel plate;
a spring bar spanning between and attaching to the two parallel plates, wherein the spring bar is compressibly removable from the key holder;
one or more insert components comprising attachment heads that are in communication with the spring bar, wherein the one or more insert components are removable from the spring bar when the spring bar is removed from the key holder and wherein the one or more insert components comprise a locator component that further comprises one or more of a Bluetooth component, a GPS component, and an RFID component; and
a processing module disposed within the key holder and in communication with a wireless module, wherein the wireless module comprises a automobile ignition transponder and a automobile keyless entry wireless antenna.

14. The key holder recited in claim 13, wherein at least one of the one or more insert components comprises a key blade.

15. The key holder recited in claim 13, wherein at least one of the attachment heads comprise an indent that is configured to mate with a notch on the spring bar.

16. The key holder recited in claim 13, wherein at least one of the one or more insert components comprises a razorblade holder that further comprises a cut-out with one or more holding tabs integrated on an interior surface of the cut-out, wherein the one or more holding tabs are configured to mate with indents on the top of a razorblade such that the holding tabs allow a razorblade to be inserted into the razorblade holder, but prevent the razorblade from being withdrawn from the holder.

17. The key holder recited in claim 13, wherein the key holder comprises an integrated RFID module that is programmable through an induction channel.

18. The key holder recited in claim 13, wherein the processing module deactivates one or more features of the key holder when the processing unit is unable to communicate with an external computing device.

19. A key holder for holding a variety of different physical keys and wireless key devices, the key holder comprising:
- two parallel plates physically joined together by an attachment point spanning down the longitudinal midsection of each parallel plate;
- a first spring bar and a second spring bar spanning between and attaching to both of the two parallel plates, wherein the first spring bar and the second spring bar are each compressibly removable from the key holder;
- a key blade insert component comprising a first attachment head that is in communication with the first spring bar, wherein the key blade insert component is removable from the first spring bar when the first spring bar is removed from the key holder;
- an insert component comprising a second attachment head that is in communication with the second spring bar, wherein the insert component is removable from the second spring bar when the second spring bar is removed from the key holder; and
- a processing module disposed within the key holder and in communication with a wireless module, wherein the wireless module comprises an automobile ignition transponder and an automobile keyless entry wireless antenna that both correspond to the same vehicle that corresponds with the key blade insert.

* * * * *